US007102602B2

(12) United States Patent
Kim et al.

(10) Patent No.: US 7,102,602 B2
(45) Date of Patent: Sep. 5, 2006

(54) DOUBLY CURVED OPTICAL DEVICE FOR EYEWEAR AND METHOD FOR MAKING THE SAME

(75) Inventors: Yoan Kim, Hudson, OH (US); Roy Miller, Akron, OH (US); Bahman Taheri, Hudson, OH (US)

(73) Assignee: AlphaMicron, Inc., Kent, OH (US)

( * ) Notice: Subject to any disclaimer, the term of this patent is extended or adjusted under 35 U.S.C. 154(b) by 370 days.

(21) Appl. No.: 09/956,507

(22) Filed: Sep. 18, 2001

(65) Prior Publication Data

US 2003/0052838 A1    Mar. 20, 2003

(51) Int. Cl.
*G09G 3/36*      (2006.01)

(52) U.S. Cl. .......................... 345/87; 345/32; 428/1.5; 349/158

(58) Field of Classification Search .................. 345/87, 345/88, 89, 4, 5, 6, 32, 204, 205, 206; 349/10, 349/13, 153, 155, 158; 264/1.32; 351/41; 428/1.1, 1.5, 1.6
See application file for complete search history.

(56) References Cited

U.S. PATENT DOCUMENTS

| | | | | |
|---|---|---|---|---|
| 4,279,474 A | | 7/1981 | Belgorod ................ 350/331 R |
| 4,883,548 A | | 11/1989 | Onoki ......................... 156/99 |
| 5,029,985 A | * | 7/1991 | Suzuki et al. ................. 349/74 |
| 5,194,973 A | * | 3/1993 | Isogai et al. ................... 349/10 |
| 5,309,519 A | * | 5/1994 | Park et al. ................... 381/190 |
| 5,608,567 A | * | 3/1997 | Grupp ........................ 359/275 |
| 6,180,033 B1 | | 1/2001 | Greshes ..................... 264/1.32 |
| 6,261,398 B1 | * | 7/2001 | Costa .......................... 156/102 |
| 6,262,787 B1 | | 7/2001 | Kamoi et al. ................. 349/96 |
| 6,266,123 B1 | | 7/2001 | Maejima et al. ............. 349/160 |
| 6,319,433 B1 | * | 11/2001 | Kohan ....................... 264/1.32 |
| 6,416,908 B1 | * | 7/2002 | Klosner et al. ................. 430/5 |
| 6,433,770 B1 | | 8/2002 | Gross et al. ................. 345/102 |
| 6,437,925 B1 | * | 8/2002 | Nishioka ..................... 359/726 |
| 6,626,532 B1 | * | 9/2003 | Nishioka et al. .............. 351/41 |
| 2001/0024685 A1 | * | 9/2001 | Boulton et al. ............. 427/162 |

FOREIGN PATENT DOCUMENTS

| | | |
|---|---|---|
| EP | 0 341 519 A2 | 11/1989 |
| EP | 0 816 902 AW | 1/1998 |
| GB | 2 306 691 | 5/1997 |
| GB | 2 315 338 A | 1/1998 |
| WO | WO 85/02914 | 7/1985 |
| WO | WO 93/14435 | 7/1993 |
| WO | WO 93/24858 | 12/1993 |
| WO | WO 94/11779 | 5/1994 |

OTHER PUBLICATIONS

Research Disclosure No. 304, Aug. 1989, New York, US, pp. 559-560,XP000069739 "Polymer Dispersed Liquid Crystal Devices with Curved Surfaces".
(Author, *Title*, Relevant Pages, Date, Place of Publication (Name of Book, Journal, Etc.)).

* cited by examiner

*Primary Examiner*—Xiao Wu
(74) *Attorney, Agent, or Firm*—Renner, Kenner, Greive, Bobak, Taylor & Weber

(57) ABSTRACT

A curved optical device includes a pair of initially flat opposed flexible substrates that may have a fluid material with spacers disbursed therein disposed between the pair of substrates and sealed. The substrates have a uniform controlled distance therebetween. The substrates are permanently curved by applying heat and pressure with a mold while maintaining the controlled distance therebetween. The fluid material may be a liquid crystal to provide the optical device with enhanced optical properties.

25 Claims, 3 Drawing Sheets

DOUBLY CURVED OPTICAL DEVICE FOR EYEWEAR AND METHOD FOR MAKING THE SAME

TECHNICAL FIELD

The invention herein resides generally in the art of optical devices. More particularly, the present invention relates to a curved optical device and the method for making the same. Specifically, the present invention relates to a doubly or complex curved device where a fluid medium is captured therein.

BACKGROUND ART

One critical aspect of many optical elements is the curvature of the surface of the element. Indeed, refractive lenses derive their ability to converge or diverge light rays from the difference in curvature of their front and rear surfaces. Similarly, the focal plane of curved mirrors is determined by the mirror curvature. For most lenses and mirror applications, the surfaces in question have a spherical shape. One exception to this are lenses for correcting astigmatism which have a curvature that is a combination of spherical and cylindrical surfaces. The key feature of all these elements is that they have two-dimensional surfaces and, therefore, they have two principle curvatures. For example, a flat surface has both curvatures equal to zero. A cylindrical surface has one curvature zero while the other curvature is non-zero. A toroidal surface has both curvatures nonzero and non-equal and sphere may be defined as a special subsection where both curvatures are equal to one another and are non-zero. Accordingly, it will be appreciated that the most general optical elements, are constructed using surfaces for which both curvatures are non-zero and non-equal. Accordingly, those skilled in the art refer to these types of elements as doubly curved. Furthermore, if the curvature also changes along a given direction, the curvature is complex. For the purposes of this application, doubly and complex may be used interchangeably.

The most common optical element is the vision-correction lens used in spectacles. For all but the most severe prescriptions, these lenses are meniscus lenses, in which both surfaces are doubly curved. Corrective lenses may be fabricated having one surface doubly curved and the other flat, but this construction is undesirable since it can lead to undesired optical distortions in addition to esthetic reasons. In addition to vision correction, spectacles with doubly curved lenses are worn to protect the eyes from sunlight, glare, and foreign objects, and as fashion accessories. Other types of eyewear having doubly curved surfaces are goggles, visors, and helmet face plates. Other examples of doubly curved surfaces which light must pass either through or reflect from are windshields, glass block windows, automobile headlamps, skylights, and other optical devices and elements.

For many applications, it is common to coat additional layer or layers onto the surface of an optical element. The layer or layers provide additional functionality, such as light transmission control, anti-reflective properties or scratch resistance. Accordingly, each additional layer acts as an optical element in its own right and when it is attached to another element, the result is a compound element. There are a variety of methods for coating an optical element including vacuum deposition and liquid coating followed by curing. An alternative method is to affix a solid layer to the lens. This provides a cost effective method for achieving the desired functionality. For example, one may create a pair of "mirrored sunglasses" by affixing aluminized Mylar® onto the lenses of an ordinary pair of glasses. Another example is affixing a polarizer to a lens in polarized sunglasses. However, various difficulties arise when attempting to manufacture optical elements where one of these layers has been is attached to a doubly curved surface especially if the layer to be affixed to the doubly curved surface is initially flat. It is quickly seen that unless the initially flat Mylar® is either stretched or cut, it cannot be conformally attached to the doubly curved lens surface. Alternatively, the initially flat layer may be affixed by changing the state of the layer material during the affixing process. If the layer is softened, or even melted and affixed to the state, it can be conformally attached. Obviously, the resulting compound optical element must then be operated at a temperature lower than the temperature at which the layer was affixed.

Although affixing a homogenous solid layers in the manner described above has been accomplished, many more difficulties arise when it is desired to affix multiple layers to an optical element, especially if their thicknesses are to be controlled to better than a micron. Further, this task has been thought impossible if one of the layers affixed is a fluid at the operating temperature. Currently, there are no devices in the market where a fluid with a uniform, micron-sized thickness is affixed to a solid curved layer. If a fluid layer is successfully affixed to a curved surface, a number of applications will become possible. One example of such a device would be a liquid crystal lens based on U.S. Pat. No. 6,239,778, which is incorporated herein by reference.

There have been many unsuccessful attempts to achieve this task since if successful, that would allow use of technologies such as liquid crystals for electronically controllable light transmission. To date, there are no such devices in the market due to the tight tolerances required. One attempt at solving this problem is to employ doubly curved half-lenses which are separated by spacers of the desired gap distance. However, due to the small cell gaps that are required for such devices—on the order of microns—it is difficult to properly align both lenses while maintaining the required gap distance over the entire area of the lenses. The problem is compounded by the presence of electrodes which can result in electrical shorts by micron sized variations in the thickness. Furthermore, if the proper gap spacing is not maintained within less than a micron, the desired optical properties are unattainable. And it is has been found to be quite difficult to properly shape the outer surfaces of such devices so that they conform to the shape of adjacent optical elements. Due to the failure with pre-shaped substrates, the concept of thermoforming a flat multilayered structure where one layer is a fluid has thought to be impossible.

Therefore, there is a need for a device and a method of making it in which two layers are separated from one another by a controlled distance. In other words, this controlled distance provides a gap between the two optical layers and this gap, extending over the area of the optical element, creates an encapsulated volume. This encapsulated volume may be occupied by a fluid substance or substances that perform desired optical, protective, or other functions. If the layers to be affixed to the curved substrate are layers of a liquid crystal device, the resulting compound optical element could, for example, have electronically controllable light transmission. Those skilled in the art will appreciate that maintaining the gap in such devices is critical to ensure correct operation.

SUMMARY OF THE INVENTION

In light of the foregoing, it is a first aspect of the present invention to provide a curved optical device for eyewear and method for making the same.

It is another aspect of the present invention to provide a curved optical device which incorporates opposed substrates with a controlled distance therebetween.

It is a further aspect of the present invention to provide a curved optical device, as set forth above, to maintain the controlled distance between the substrates by use of spacers.

It is yet another aspect of the present invention, as set forth above, to provide the substrates with coatings to control the properties of a fluid material that may be captured between the substrates, wherein the coatings may be electrodes, alignment layers, and the like.

It is still another aspect of the present invention to provide a curved optical device, as set forth above, wherein the substrates are curved with the curvature property of up to 10 diopter in at least one dimension.

It is still a further aspect of the present invention to provide a curved optical device, as set forth above, wherein the device is formed by a process that heats the temperature of an initially flat pair of opposed substrates with the controlled distance therebetween to a predetermined temperature before, during, or after application of a controlled pressure to the substrates so that they conform to the desired curved shape.

It is an additional aspect of the present invention to provide a curved optical device and method for making the same, as set forth above, to provide opposed mold faces to conform the opposed substrates so that the desired curved shape is formed, whereupon the pressure and heat are removed in such a manner so that the curved shape remains while maintaining the desired controlled distance between the substrates.

It is yet another aspect of the present invention to provide a curved optical device and method for making the same, as set forth above, wherein a fluid material is captured between the substrates. In regard to this aspect of the invention, the fluid material may be filled prior to or after the forming process.

It is still yet another aspect of the present invention to provide a curved optical device, as set forth above, wherein an initially curved optical device that includes substrates with a controlled distance therebetween may be imparted with the heat and pressure as indicated above to further impart additional curvature properties to the device.

Yet an additional aspect of the present invention is to provide a curved optical device, as set forth above, wherein the substrates are attached to a half-lens which substantially conforms to one of the surfaces of the curved device.

Still yet another aspect of the present invention is to provide a curved optical device, as set forth above, wherein a second half-lens that substantially conforms to the other side of the curved device is attached thereto.

The foregoing and other aspects of the present invention, which shall become apparent as the detailed description proceeds, are achieved by a curved optical device including a pair of initially flat opposed flexible substrates and a plurality of spacers disposed between the pair of substrates and sealed, the substrates having a controlled distance therebetween, the substrates curved while maintaining the controlled distance therebetween.

Other aspects of the present invention are attained by a method for constructing a curved optical device including providing a separated layer stack having opposed flexible substrates with a controlled distance therebetween to form a gap and thermoforming the separated layer stack to impart a curved shape thereto.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
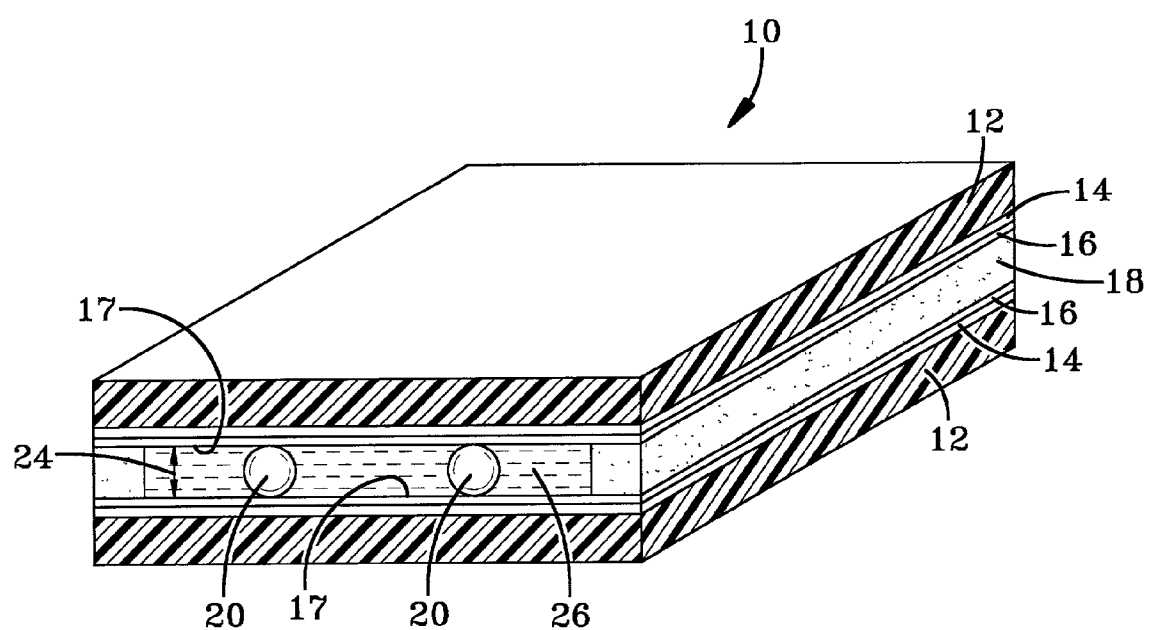
FIG. 1 is a schematic diagram of the separated layer stack which is employed in the formation of a curved optical device.

Referring now to the drawings and, more particularly, to FIG. 1, it can be seen that a separated layer stack utilized in manufacturing the present invention is designated generally by the numeral 10. Generally, the stack 10 includes a pair of opposed substrates 12. In the preferred embodiment, the substrates 12 are substantially flat sheets of thermoplastic polymer. Applied to each substrate may be any number of coatings required for the proper optical operation of the completed optical device. These coatings may include a conductive or electrode layer 14, such as indium tin oxide, possibly patterned for an electro-optic device. An alignment layer 16 may also be provided on the electrode layer 14 to control the orientation of any liquid crystal materials disposed between the substrates. Other coatings may include an anti-reflection coating for an eyewear device, an ultraviolet blocking layer for solar protection and the like. It will be appreciated that such coatings are not affected during the fabrication of the completed device. With the coatings applied, the substrates have an inner surface 17 which refers to the surface that adjoins an encapsulated volume while an outer surface of substrates is the surface not adjoining the encapsulated volume. A sealing material 18 is provided around the outer periphery or edges of the inner surfaces 17 of the substrates 12 and are ultimately sealed to prevent any encapsulated fluid from leaking from between the substrates 12.

Spacer materials 20 of the same size are introduced onto the inner surface 17 of one or both prepared substrates 12. The spacers 20 prevent the two inner substrates surfaces 17 from being any closer to one another than the spacer size. The spacers are constructed of a material that is more rigid than the substrate material at every stage of the manufacturing process. As will be appreciated, the spacers used are selected such that the desired optical device is obtained. The two flat substrates 12 are positioned facing one another, inner surface 17 to inner surface 17, with the spacers 20 therebetween to form a "sandwich" structure. It is believed that the spacers may be sized anywhere between about 3 µm to about 2 mm. If desired, a fluid material 26 is introduced at this time into the gap or controlled distance 24 by capillary action or vacuum filling. Alternatively, a desired fluid material 26 may be applied to one inner surface either before or after the spacers are applied and the other substrate is positioned. Or, the spacers may be mixed or otherwise incorporated in the desired fluid, and this combination may be applied to one inner surface before the other substrate is positioned. The fluid material 26 is likely a liquid crystal material, but it could also be a solution containing a dye, for example, a photochromic dye; electrochromic electrolytes; or resins. The sealing material 18 encloses the entire stack 10 so as to retain the fluid material 26. It will be appreciated that the sealing material may be an adhesive that is compatible for use with the thermoplastic polymer material of the substrates and will have a temperature compatible with the other steps of the manufacturing process. As will be discussed later, the fluid material could be filled between the substrates after a curvature is imparted to the stack.

Figure 2:
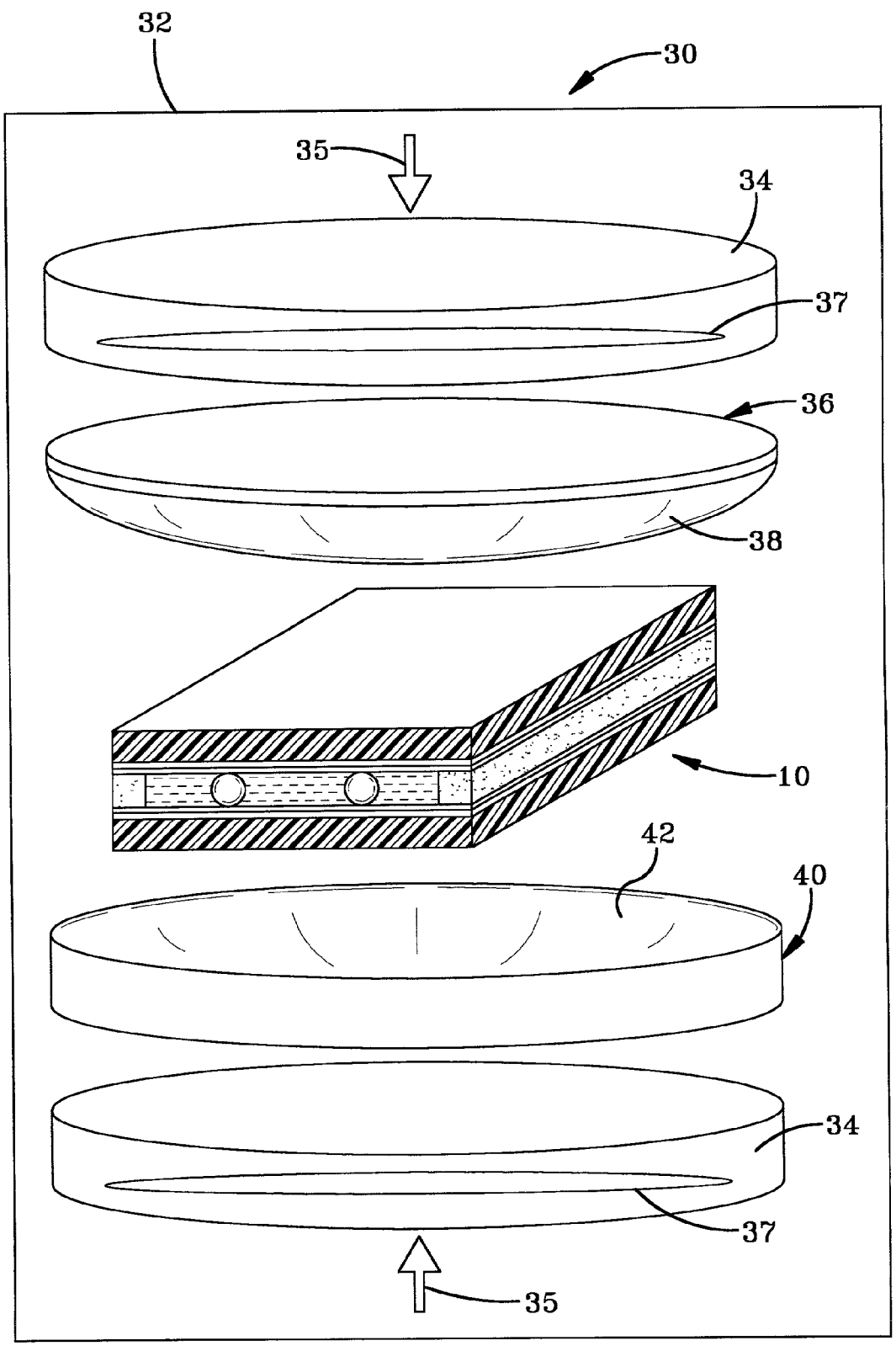
FIG. 2 is a schematic diagram showing an apparatus for forming the device.

Referring now to FIG. 2, it can be seen that a forming apparatus, designated generally by the numeral 30, maybe employed to manufacture a curved optical device. The apparatus 30 includes a heat chamber 32 which is able to raise and lower temperatures as needed during the manufacturing process. Contained within the heat chamber 32 are a pair of opposed platens 34 which are adaptable to receive compressional forces 35 so as to allow for closure and opening of the platens 34 in a conventional manner. Application of the compressional force 35 is controlled and coordinated with the application of heat 32 in a manner that will be described below. Heating elements 37 may be carried by the platens 34 or even the molds 36, 40. Alternatively, the stack may be heated in a separate chamber and then transferred in a timely manner to the molds for forming. Attached to the upper platen is a half-mold 36 which provides a mold face 38. Likewise, attached to the lower platen 34 is a second half-mold 40 which has a mold face 42.

The initially flat, separated layer stack 10 is inserted between the two mold faces 38 and 42, wherein each mold face possess the desired final shape for each side of the optical device. The faces may be mates for one another, such that by themselves, one fits tightly inside the other with minimal residual space therebetween. Or one mold face may have a slightly different curvature than the other mold face depending upon the end use of the device. The mold faces 38, 42 remain rigid and substantially undeformable throughout the fabrication process. The layer stack 10 is brought to an elevated temperature by the chamber 32, and a compressive force 35 is applied to the stack 10 by the platens 34, wherein the force is essentially perpendicular to the initially flat layer. The temperatures, compressive forces and time are believed to be critically linked in forming the end product. The combination of temperature force and time must be large enough so that the substrate 12 conforms to the mold faces 38, 42, and so that they permanently retain the mold face shape after the temperature is lowered and the force removed. In other words, no other restraining forces are required to maintain a curved shape of the optical device. However, the temperature and force must not be great enough to bring the inner substrate surfaces closer to one another than the size of the spacers. It has been found that if the temperature and/or force are too large, the substrates become too close to each other and the substrates soften too much adjacent the individual spacers, thus dimpling the substrate. Accordingly, the temperature/force combination and their rates and duration of application must be large enough to imbue the initially flat layer stack 10 with the desired curved shape, but not large enough to change the separation between the substrate inner surfaces 17. At a higher processing temperature, a smaller compression force is required. Conversely, at a lower processing temperature, a greater compression force and/or time is needed. It will be appreciated that the temperature of the process must never exceed the melting temperatures of the substrates. The operating temperature of the completed optical device produced in this manner is below the thermal forming temperature. The compressive force and elevated temperature are applied to the stack 10 for a sufficient time such that the stack 10 retains the shape imbued by the molds after the force is removed and the temperature lowered. Moreover, the shape remains without the application of any other force. Some relaxation of the shape may occur depending on the parameters used.

Figure 3:
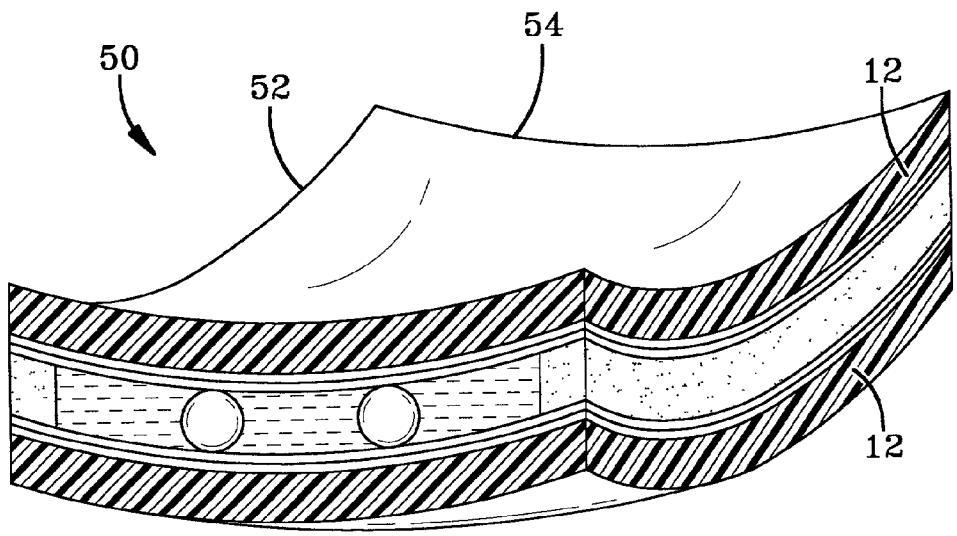
FIG. 3 is a cross-sectional schematic drawing of the device after the forming process.

As best seen in FIG. 3, after the stack 10 is removed from the forming apparatus 30, a doubly curved optical device, designated generally by the numeral 50, is provided. It will be appreciated that such the forming apparatus 30 may form only a singly curved device, but it is believed that a doubly curved device provides the most functionality. In any event, the foregoing process is believed capable of producing a device 50 which has a first curvature 52 corresponding to 0 to 10 diopter and, independently, a second curvature 54 corresponding to 0 to 10 diopter. A definite upper diopter limit using this process has not yet been realized. It has been found that the foregoing process maintains the controlled distance between the inner surfaces throughout the entire area of the device so that the desired optical properties are uniform and acceptable for use in controlling the transmission and/or reflection of light. The device may be affixed to a more rigid substrate by means of adhesives shortly after forming process. This will insure permanency in the curvature achieved.

The encapsulated volume within the element described in the preferred embodiment can contain any substance that is a fluid at the apparatus forming temperature and compressive force. This substance may or may not remain a fluid at the operating temperature of the device. In some instances, it may be desirable for the encapsulated volume to contain nothing. It will also be appreciated that the sealing material 18 may be sealed during the thermoforming process rather than before the thermoforming process. Accordingly, when the sandwich or stack 10 is assembled, a pattern of adhesive can be "printed" on one of the inner substrates around the perimeter of the desired encapsulated volume. In the event a fluid material was not filled between the substrates prior to forming a curved shape, it may be done after the forming process provided an opening is provided through the sealing material.

The completed device 50 could also be manufactured by employing substrates that are initially curved rather than flat. It is believed that by using initially curved substrates, one may obtain a larger final curvature or area of the finished element than could be obtained using initial flat substrates. Accordingly, the total amount of curvature can be improved. Accordingly, this embodiment may be useful for producing devices requiring large curvatures, such as devices applied to helmet face plates. Moreover, complex curves may be obtained—such as around a nose bridge area—for manufacturing goggles.

EXAMPLE 1

Two coated thermoplastic polyester substrates 12 (for example, OC-100 from CPFilms, Inc.) having a diameter of about 2 inches with electrodes 14 are coated with an alignment layer material solution (for example, JALS 204-R40 from Japan Synthetic Rubber Co.) to form an alignment layer 16 with a preferable thickness of 0.1 μm after the coating is dried up. Spacers 20 of a 5 μm diameter (for example, Licristar 50 from EM Industries, Inc.) are distributed uniformly to control the gap 24 throughout the stack 10. Preferably, the spacers 20 are embedded in at least one alignment layer 16 to prevent the spacers 20 from moving around and aggregating themselves in the presence of an external pressure 35 during a thermoforming process. At least one alignment layer 16 is rubbed using a velvet cloth to align the liquid crystal material 26. The stack 10 is constructed by assembling the two substrates, alignment layers facing to each other, after the sealing material 18 such as an adhesive (for example, Loctite 349 from Loctite Corp.) is dispensed on at least one surface 17 along the edge of a cell leaving at least one opening. The adhesive is cured to keep the spacing between the substrates. The cell is filled with a liquid crystal formulation 26 (for example, ZLI 2806 from EM Industries, Inc.) through the opening. The opening is sealed with an edge sealing adhesive, and the adhesive is cured to encapsulate the formulation 26. The stack 10 is placed between glass lenses (for example, Plano CVX BK7 and Plano CNCV BK7 from OptoSigma, Inc.) which are used as molds 36, 40 such that the entire cell area is subject to a pressure 35 via contacts with the faces 38, 42 during a thermoforming process. The two inch plano-convex and plano-concave glass lenses have a focal length of ±150 mm that correspond to 6.8 diopter. On the top of the mold 36 a pressure 35 using the load of 0.5 to 2 kg is applied to keep pressing the cell 10. The whole stack is transferred into a chamber 32 at 115° C., and kept for 1 to 20 hours to achieve a desired curvature from thermoforming. The whole stack is removed from the chamber 32 to cool down to a temperature below 50° C. and a doubly curved liquid crystal cell 50 is formed.

The resulting curvature depends upon the thermoforming temperature, pressure, time and diopter of the top and bottom glass lenses used. A curvature corresponding up to 8 diopter has already been fabricated with this technique. Being filled with a guest-host formulation of a chiral material (for example, S-811 from EM Industries, Inc.), dye (for example, S-428 from Mitsui Toatsu Chemicals, Inc.), and liquid crystal (for example, ZLI 2806 from EM Industries, Inc.) the cell exhibited same electro-optical properties before and after thermoforming, such as light transmission of 52 to 12% and haze less than 3%.

EXAMPLE 2

Two coated thermoplastic polycarbonate substrates 12 (for example, HA120-B60 from N.I. Teijin Shoji Co., Ltd.) having a diameter of about two inches with electrodes 14 are coated with an alignment layer material solution (for example, JALS 204-R40 from Japan Synthetic Rubber Co.) to form an alignment layer 16 with a preferable thickness of 0.1 μm after the coating is dried up. Spacers 20 of a 5 μm diameter (for example, Licristar 50 from EM Industries, Inc.) are distributed uniformly to control the gap 24 throughout the stack 10. Preferably, the spacers 20 are embedded in at least one alignment layer 16 to prevent the spacers 20 from moving around and aggregating themselves in the presence of an external pressure 35 during a thermoforming process. At least one alignment layer 16 is rubbed using a velvet cloth to align the liquid crystal material 26. The stack 10 is constructed by assembling the two substrates, alignment layers facing to each other, after the sealing material 18 such as an adhesive (for example, Loctite 349 from Loctite Corp.) is dispensed on at least one surface 17 along the edge of a cell leaving at least one opening. The adhesive is cured to keep the spacing 24 between the substrates. The cell is filled with a liquid crystal formulation 26 (for example, ZLI 2806 from EM Industries, Inc.) through the opening. The opening is sealed with the adhesive and the adhesive is cured to encapsulate the formulation 26. The cell 10 is placed between glass lenses (for example, Plano CVX BK7 and Plano CNCV BK7 from OptoSigma, Inc.) which are used as platens 36, 40 such that the entire cell area is subject to a pressure 35 via contacts with the faces 38, 42 during a thermoforming process. The two inch plano-convex and plano-concave glass lenses have a focal length of ±150 mm that correspond to 6.8 diopter. The stack is transferred into a chamber 32 at 115° C., and kept for 1–2 hours to soften the stack 10. On the top of the mold 36 a pressure 35 using the load of 0.5 to 2 kg is applied to thermoform the stack 10. The whole stack is removed from the chamber 32 to cool down to a temperature below 50° C. and a doubly curved liquid crystal cell 50 is formed.

The resulting curvature depends upon the thermoforming temperature, pressure, time and diopter of the top and bottom glass lenses used. The curvature corresponding up to 8 diopter has already been fabricated with this technique. Being filled with a guest-host formulation of a chiral material (for example, S-811 from EM Industries, Inc.), dye (for example, S-428 from Mitsui Toatsu Chemicals, Inc.), and liquid crystal (for example, ZLI 2806 from EM Industries, Inc.) the cell exhibited same electro-optical properties before and after thermoforming, such as light transmission of 60 to 13% and haze less than 3%.

EXAMPLE 3

Two coated thermoplastic polyester substrates 12 (for example, OC-100 from CPFilms, Inc.) having a diameter of about two inches with electrodes 14 are coated with an alignment layer material solution (for example, JALS 204-R40 from Japan Synthetic Rubber Co.) to form an alignment layer 16 with a preferable thickness of 0.1 mm after the coating is dried up. Spacers 20 of a 5 μm diameter (for example, Licristar 50 from EM Industries, Inc.) are distributed uniformly to control the gap 24 throughout the stack 10. Preferably, the spacers 20 are embedded in at least one alignment layer 16 to prevent the spacers 20 from moving around and aggregating themselves in the presence of an external pressure 35 during a thermoforming process. At least one alignment layer 16 is rubbed using a velvet cloth to align the liquid crystal material 26. The stack 10 is constructed by assembling the two substrates, alignment layers facing to each other, after the sealing material 18 such as an adhesive (for example, Loctite 349 from Loctite Corp.) is dispensed on at least one surface 17 along the edge of a cell leaving at least one opening. The adhesive is cured to keep the spacing 24 between the substrates. The empty cell 10 is placed between molds 36, 40 which may be in the form of glass lenses (for example, Plano CVX BK7 and Plano CNCV BK7 from OptoSigma, Inc.) such that the entire cell area is subject to a pressure 35 via contacts with the mold surfaces 38,42 during a thermoforming process. The two inch diameter plano-convex and plano-concave glass lenses have a focal length of ±150 mm that correspond to 6.8 diopter. On the top of the mold 36 a pressure 35 using the load of 0.5 to 2 kg is applied to keep pressing the empty stack 10. The whole stack is transferred into the chamber 32 at 115° C., and kept for 1 to 15 hours to achieve a desired curvature from thermoforming. The whole stack is removed from the chamber 32 to cool down to a temperature below 50° C. and a doubly curved cell 50 is formed. The resulting curvature depends upon the thermoforming temperature, time, pressure, and diopter of the top and bottom glass lenses used. The curvature corresponding up to 8 diopter has already been fabricated with this technique.

The doubly curved cell 50 is filled with a liquid crystal formulation 26 (for example, ZLI 2806 from EM Industries, Inc.) through the opening. The opening is sealed with the edge sealing adhesive and the adhesive is cured to encapsulate the formulation 26. Being filled with a guest-host formulation of a chiral material (for example, S-811 from EM Industries, Inc.), dye (for example, S-428 from Mitsui Toatsu Chemicals, Inc.), and liquid crystal (for example, ZLI 2806 from EM Industries, Inc.) the cell exhibited same electro-optical properties before and after curved, such as light transmission of 52 to 12% and haze less than 3%.

Figure 4:
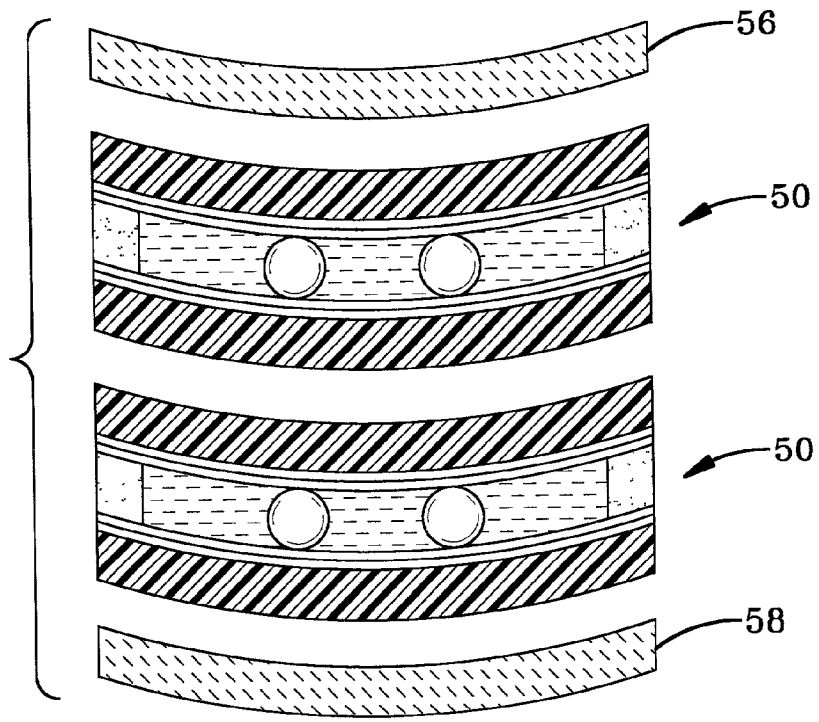
FIG. 4 is a cross-sectional view of the optical device positioned between two half-lenses.

The advantages of the foregoing process and device are readily apparent. Primarily, the process allows for the mass production of optical elements 50 that may be secured to existing half-lenses 56 and 58 as seen in FIG. 4. Indeed, any number of optical elements 50 can be positioned directly adjacent one another and be placed adjacent one lens or between half-lenses. This would allow for multiple combinations of optical properties to be provided by a single device. For example, one stack could contain a liquid crystal material, and a second adjacent stack could have a dye. Alternatively, the elements 50, and lenses may be slightly spaced apart depending upon the end-use. Such a device would impart functionality that can only be provided by the fluid medium, such as a liquid crystal material. Moreover, such a device can be provided which is conformal to existing shapes so as to be compatible with eyewear fashions that are functional, yet remain lightweight. The methodology and device described above also provides a device which is curved and which maintains the controlled gap spacing between substrates that is required to ensure the effective operation of the device while providing the desired optical properties.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A thermoformed optical device, comprising:
a pair of opposed flexible substrates; and
a plurality of spacers disposed between said pair of substrates, said substrates having a controlled distance therebetween and adapted to receive a fluid; characterized in that the device is thermoformed to a curved shape while maintaining said controlled distance therebetween, and wherein said substrates are curved to a value of anywhere between 0 to 10 diopter for a first curvature and, independently, a value of 0 to 10 diopter for a second curvature.

2. The device according to claim 1 wherein said controlled distance is about 3 μm or greater.

3. The device according to claim 1 further comprising a fluid material disposed between said pair of substrates.

4. The device according to claim 3 wherein both said substrates have electrode layers disposed thereon and facing one another.

5. A thermoformed optical device, comprising:
a pair of opposed flexible substrates; and
a plurality of spacers disposed between said pair of substrates, said substrates having a controlled distance therebetween and adapted to receive a fluid; characterized in that the device is thermoformed to a curved shape while maintaining said controlled distance therebetween;
a fluid material disposed between said pair of substrates, wherein both said substrates have electrode layers disposed thereon and facing one another, and wherein said curved shape is curved in at least two directions.

6. The device according to claim 5 wherein said fluid material is selected from the group consisting of a resin, a dye, an electrochromic electrolyte, and a liquid crystal material.

7. The device according to claim 5 further comprising a sealant selectively disposed between said pair of substrates.

8. The device according to claim 5 further comprising:
a first half-lens having a curved surface positioned adjacent to one side of said pair of curved substrates, wherein said pair of curved substrates substantially conforms to the shape of said curved surface of said first half-lens.

9. The device according to claim 8 further comprising:
a second half-lens having a curved surface positioned adjacent to the opposite side of said pair of curved substrates, wherein the opposite side of said pair of curved substrates substantially conforms to the shape of said curved surface of said second half-lens.

10. The device according to claim 5 further comprising:
at least a second pair of opposed flexible substrates;
a plurality of uniformly sized spacers disposed between said second pair of substrates, said second substrates having a controlled distance therebetween and adapted to receive a fluid; and
said second pair of substrates thermoformed to said curved shape while maintaining said controlled distance therebetween;
wherein said first and second pairs of substrates substantially conform to each other's curvatures.

11. The device according to claim 10 wherein said first pair of substrates has a first fluid material contained therebetween and wherein said second pair of substrates has a second fluid material contained therebetween.

12. The device according to claim 11 wherein said first and said second pair of substrates are stacked adjacent to one another and substantially conform to each other's curvatures.

13. The device according to claim 10 further comprising:
a first half-lens having a curved surface positioned adjacent to one side of said stacked pairs of substrates, wherein one side of said stacked pairs of substrates substantially conforms to the shape of said curved surface of said first half-lens.

14. The device according to claim 13 further comprising:
a second half-lens having a curved surface positioned adjacent to the opposite side of said stacked pairs of substrates, wherein said opposite side of said stacked pairs of substrates substantially conforms to the shape of said curved surface of said second half-lens.

15. A method for constructing a thermoformed optical device, comprising:
assembling at least one separated layer stack having substantially flat opposed flexible substrates with a controlled distance therebetween to form a gap and adapted to receive a fluid; and thermoforming said assembled separated layer stack to a desired curvature while maintaining said controlled distance, wherein said curvature is in more than one direction.

16. The method according to claim 15 further comprising:
disposing a fluid material into said gap; and
selectively sealing said gap.

17. The method according to claim 16 wherein said fluid material is selected from a group consisting of a resin, a dye, an electrochromic electrolyte, and a liquid crystal material.

18. A method for constructing a thermoformed optical device, comprising:
assembling at least one separated layer stack having substantially flat opposed flexible substrates with a controlled distance therebetween to form a gap and adapted to receive a fluid;
thermoforming said assembled separated layer stack to a desired curvature while maintaining said controlled distance;
selectively disposing a sealant between said substrates;
disposing a fluid material into said gap; and then
thermoforming said assembled separated layer stack to a desired curvature while maintaining said controlled distance.

19. The method according to claim 18 wherein said fluid material is selected from a group consisting of a resin, a dye, an electrochromic electrolyte, and a liquid crystal material.

20. The method according to claim 18 wherein said curvature is in more than one direction.

21. The method according to claim 18 further comprising:
positioning a first half-lens having a curved surface adjacent to one side of said stack, wherein one side of said stack substantially conforms to the shape of said curved surface of said first half-lens.

22. The method according to claim 21 further comprising:
positioning a second half-lens having a curved surface adjacent to the opposite side of said stack, wherein the opposite side of said stack substantially conforms to the shape of said curved surface of said second half-lens.

23. The method according to claim 18 further comprising:
assembling said separated layer stack from substantially curved substrates, separated by spacers to maintain said controlled distance; and
thermoforming said stack to a desired curvature while maintaining said controlled distance.

24. A method for constructing a thermoformed optical device, comprising:
assembling at least one separated layer stack having substantially flat opposed flexible substrates with a controlled distance therebetween to form a gap and adapted to receive a fluid medium;
thermoforming said assembled separated layer stack to a desired curvature while maintaining said controlled distance;
assembling another separated layer stack with substantially curved opposed flexible substrates with a controlled distance therebetween to form a gap;
selectively disposing a sealant between said substrates;
disposing a fluid medium into said gaps; and
thermoforming said assembled separated layer stacks to a desired curvature while maintaining said controlled distance for each said stack.

25. A method for constructing a thermoformed optical device, comprising:
assembling at least one separated layer stack having substantially flat opposed flexible substrates with a controlled distance therebetween to form a gap and adapted to receive a fluid medium;
thermoforming said assembled separated layer stack to desired curvature while maintaining said controlled distance;
assembling another separated layer stack with substantially flat opposed flexible substrates with a controlled distance therebetween to form a gap and adapted to receive a fluid medium;
thermoforming said assembled separated layer stacks to a desired curvature while maintaining said controlled distance for each said stack;
selectively disposing a sealant between said substrates; and
disposing a fluid medium into said gaps.

* * * * *